US010097045B2

(12) United States Patent
Guidi

(10) Patent No.: US 10,097,045 B2
(45) Date of Patent: Oct. 9, 2018

(54) APPARATUS AND A METHOD FOR WIRELESS TRANSMISSION OF POWER BETWEEN DC VOLTAGE SOURCES

(71) Applicant: Wärtsilä Norway AS, Stord (NO)

(72) Inventor: Giuseppe Guidi, Trondheim (NO)

(73) Assignee: WARTSILA NORWAY AS, Norge (NO)

( * ) Notice: Subject to any disclaimer, the term of this patent is extended or adjusted under 35 U.S.C. 154(b) by 0 days.

(21) Appl. No.: 15/542,942

(22) PCT Filed: Jan. 19, 2016

(86) PCT No.: PCT/NO2016/050006
§ 371 (c)(1),
(2) Date: Jul. 12, 2017

(87) PCT Pub. No.: WO2016/118020
PCT Pub. Date: Jul. 28, 2016

(65) Prior Publication Data
US 2017/0373540 A1    Dec. 28, 2017

(30) Foreign Application Priority Data
Jan. 19, 2015    (NO) .................................... 20150087

(51) Int. Cl.
H02J 7/00    (2006.01)
H01F 38/00    (2006.01)
(Continued)

(52) U.S. Cl.
CPC .............. *H02J 50/12* (2016.02); *H01F 38/14* (2013.01); *H02J 7/025* (2013.01); *H02M 3/33507* (2013.01)

(58) Field of Classification Search
CPC ........... H02J 50/12; H02J 7/025; H01F 38/14; H02M 3/33507
(Continued)

(56) References Cited

U.S. PATENT DOCUMENTS 5,084,652 A * 1/1992 Kakitani ............ H05B 41/2827
                                                    315/219
5,495,149 A * 2/1996 Hiramatsu ........... H05B 41/282
                                                    315/209 R
(Continued)

FOREIGN PATENT DOCUMENTS

EP    2736148 A1    5/2014
EP    2 763 279 A1    8/2014
(Continued)

OTHER PUBLICATIONS

Norwegian Search Report issued by the Norwegian Patent Office in relation to Norwegian Patent Application No. 20150087 dated May 12, 2015 (2 pages).
(Continued)

*Primary Examiner* — M'Baye Diao
(74) *Attorney, Agent, or Firm* — Robert P. Michal, Esq.; Carter, DeLuca, Farrell & Schmidt, LLP

(57) ABSTRACT

An apparatus for wireless transmission of power from a DC voltage source to a DC voltage load, includes: one primary coil coupled with one secondary coil, the primary coil and the secondary coil each equipped with at least one capacitor, so that the primary coil resonates at a frequency that at least equal the secondary coil resonant frequency; the resonant coils are mutually moveable; a converter that converts the DC voltage at a primary side to an AC voltage of controllable magnitude and frequency; at least one rectifier at the secondary side converts the AC voltage at the terminals of the secondary coil to a DC voltage at the load on the secondary side; and a control system that regulates the
(Continued)

power flow by changing the magnitude and frequency of the AC voltage at the terminals of the primary resonant coil.

13 Claims, 7 Drawing Sheets

(51) Int. Cl.
  *H02J 50/12* (2016.01)
  *H02J 7/02* (2016.01)
  *H02M 3/335* (2006.01)
  *H01F 38/14* (2006.01)
(58) Field of Classification Search
  USPC .......................................... 320/108; 307/104
  See application file for complete search history.

(56) References Cited

U.S. PATENT DOCUMENTS

| | | | | |
|---|---|---|---|---|
| 6,051,959 A * | 4/2000 | Tupper | .................. | H02P 9/305 322/78 |
| 6,490,177 B1 * | 12/2002 | Figueroa | .............. | H02M 3/335 363/131 |
| 7,209,373 B2 * | 4/2007 | Oicles | ................. | H02M 3/3376 307/108 |
| 7,564,200 B2 * | 7/2009 | Ichikawa | ........... | H05B 41/2882 315/224 |
| 8,294,419 B2 * | 10/2012 | Sasaki | ................... | B60W 20/13 180/65.1 |
| 8,418,823 B2 * | 4/2013 | Matsumura | .............. | B60K 1/04 191/10 |
| 8,526,206 B2 * | 9/2013 | Fotherby | ................. | H02M 1/08 327/424 |
| 9,039,694 B2 * | 5/2015 | Ross | .................. | A61B 18/1233 606/32 |
| 9,307,587 B1 * | 4/2016 | Xiong | ................. | H02M 3/3385 |
| 2005/0281059 A1 * | 12/2005 | Yasumura | ........... | H02M 1/4241 363/16 |
| 2011/0051467 A1 | 3/2011 | Nakanishi | | |
| 2011/0259953 A1 * | 10/2011 | Baarman | .................. | G01F 23/20 235/375 |
| 2012/0313728 A1 * | 12/2012 | Cairo, Jr. | .................. | H02J 3/01 333/174 |
| 2013/0026850 A1 * | 1/2013 | Throngnumchai | ... | B60L 11/182 307/104 |
| 2013/0033228 A1 | 2/2013 | Raedy | | |
| 2013/0270919 A1 * | 10/2013 | Miller | ..................... | H01F 38/14 307/104 |
| 2013/0301308 A1 * | 11/2013 | Hosotani | ............. | H02M 3/3381 363/21.03 |
| 2014/0001881 A1 * | 1/2014 | Murakami | .............. | H02J 5/005 307/104 |
| 2015/0311827 A1 * | 10/2015 | Villalobos | ............... | H02J 7/025 320/108 |
| 2016/0149509 A1 * | 5/2016 | Hergt | ..................... | H02M 7/04 307/82 |

FOREIGN PATENT DOCUMENTS

FR   3004596 A1   10/2014
WO   WO-2014/136391 A1   9/2014

OTHER PUBLICATIONS

Written Opinion of the International Searching Authority issued by the European Patent Office acting as the International Searching Authority in relation to International Application No. PCT/NO2016/050006 dated May 20, 2016 (5 pages).

International Search Report issued by the European Patent Office acting as the International Searching Authority in relation to International Application No. PCT/NO2015/050006 dated May 20, 2016 (3 pages).

International Preliminary Report on Patentabi9lity issued by the European Patent Office acting as the International Preliminary Examining Authority in relation to International Application No. PCT/NO2016/050006 dated Feb. 2, 2017 (6 pages).

* cited by examiner

APPARATUS AND A METHOD FOR WIRELESS TRANSMISSION OF POWER BETWEEN DC VOLTAGE SOURCES

CROSS REFERENCE TO RELATED APPLICATIONS

This application is a National Phase Entry under 35 USC § 371 of PCT Patent Application Serial No. PCT/NO2016/050006 filed Jan. 19, 2016, which claims priority to Norwegian Patent Application No. 20150087, filed Jan. 19, 2015, the disclosure of each of these applications is expressly incorporated herein by reference in their entirety.

TECHNICAL FIELD

The present invention relates to the field of inductive power transmission between two structures that are moving with respect to each other, resulting in variable coupling. In particular, it is disclosed an apparatus for wireless transmission of controllable power from a DC voltage source to a DC voltage load.

BACKGROUND ART

Whenever two current-conducting coils are placed in space so that the magnetic field generated by each of them is also linked to the other, electrical energy transfer can take place; such form of transfer is normally termed as Inductive Power Transfer (IPT).

Power transfer is in general easier to achieve when the coils are tightly coupled, that is when the magnetic flux generated by each coil almost completely links the other. The degree of coupling is often expressed in terms of the coupling coefficient k defined as:

$$k = \frac{M}{\sqrt{L_1 \cdot L_2}} \quad (0.1)$$

where k is the coupling coefficient and $0 \leq k \leq 1$
$L_1$ is the inductance of a first coil, and
$L_2$ is the Inductance of a second coil.
M is the mutual inductance of the two coils.

The most widespread form of IPT is the classical transformer, where the two coils are wound around a common ferromagnetic core, resulting in the highest possible degree of coupling. In such structure, the coupling coefficient is typically very close to unity.

Loosely coupled circuits, on the other hand, are characterized by a coupling coefficient typically lower than 0.5, meaning that a significant part of the flux generated by each coil does not link the other, resulting in magnetic "leakage". This is almost invariably the case when the coils are built on physically separated structures with non-negligible separation distance between them.

From the above description, it is also easy to understand that k is in general a function of the relative position of the two coils and may vary widely when either of the coils moves with respect to the other.

The problem of transferring power between two physically separated structures that can move with respect to each other can therefore be stated in terms of magnetic circuits as a problem of Inductive Power Transfer between loosely coupled coils with variable coupling coefficient.

In order to optimize the power transfer process and reduce losses, the physical principle of resonance can be applied to loosely-coupled magnetic circuits. A Capacitive component is added to both coils, so that the reactive power consumed by the leakage inductance is compensated by the added capacitance; such perfect compensation is achieved at the resonant frequency:

$$f_{0,send} = \frac{1}{2\pi\sqrt{L_1 C_1}}; \quad (0.2)$$
$$f_{0,pick} = \frac{1}{2\pi\sqrt{L_2 C_2}}$$

Most state-of-the-art IPT systems or apparatuses are designed so that the resonant frequencies of both coils coincide, and power transfer is performed by exciting the transmitting coil exactly at such common resonant frequency, achieving very good transfer efficiency and minimized Volt-Ampere ratings at a specific operating conditions of the sending and pickup converters that are operated at unity power factor, as the reactive power is completely contained within the resonant tanks constituted by the coils and the compensating capacitors.

In the French patent publication Fr 3004596 it is disclosed a method for inductively charging a vehicle. The primary and secondary coils of the charging system is mutually movable.

DISCLOSURE OF INVENTION

In its basic form, the IPT apparatus considered in this document is generally composed by two loosely coupled coils, two compensating capacitors (one for each coil), power converters on either side of the IPT apparatus for excitation (sending-end) and pickup. The power source at sending end is assumed to be a DC source, resulting for instance from rectification of the 50/60 Hz AC mains. The load is also assumed to be a DC load of relatively fixed voltage; a typical case is a chargeable battery.

The sending-end power converter (inverter) generates an AC voltage of controllable frequency and magnitude from the available DC voltage. The pickup-side converter (rectifier) rectifies the AC waveform resulting from the magnetic coupling, converting it to a DC signal; if designed to do so, such converter can also adapt the pickup-side impedance by changing the voltage/current levels.

In most implementations, sending and pickup coils are capacitively compensated in a way that the individual resonant frequencies coincide; the sending-end converter is then controlled to generate an excitation signal at exactly the resonant frequency, allowing for operation at unity power factor, corresponding to minimum converter current. The power flow is then regulated by changing the magnitude of the excitation signal and/or the equivalent pickup impedance.

Investigations leading to the present disclosure have shown that in case of widely variable coupling coefficient, the worst-case converter Volt-Ampere for a given power flow requirement can be significantly reduced if the apparatus is designed to operate out of resonance in certain coupling conditions.

Specifically, the apparatus is made to operate at exactly the resonant frequency when the coupling is at minimum, thus achieving the minimum possible worst-case converter current at the minimum converter voltage. However, when the coupling increases, the sending-end converter is operated out of resonance, resulting in an increased power flow for the same magnitude of excitation voltage and the same equivalent pickup impedance. As a result, the ratio between the necessary excitation voltages at maximum and minimum coupling is reduced, with the important consequence of reducing the worst-case converter and coil currents.

The method allows therefore for a significant saving in terms of semiconductor effort for the implementation of the power converters. Moreover, the coils can be realized with reduced amount of copper, resulting in lower volume, weight and cost.

In addition, a simple method to achieve ideal, slightly inductive power factor for minimized switching loss of the power converter over the whole operating range is introduced. The method is based on slight detuning of self-resonant frequencies of primary and secondary coils.

In particular it is disclosed an apparatus for wireless transmission of power from a DC voltage source to a DC voltage load, comprising:
  one primary coil and one secondary coil, the primary coil and the secondary coil each connected with means of capacitors configured to achieve a common resonance frequency, $\omega_0$;
  said one primary coil and one secondary coil are mutually movable;
  a DC/AC-converter converting the DC voltage at primary side to an AC voltage of controllable magnitude and frequency at the primary side;
  one rectifier at the secondary side converting the AC voltage at terminals of the secondary coil to a DC voltage at the load on the secondary side;
  a control system that regulates the power flow between the primary and the secondary coil and automatically adapts to changes in the mechanical positions of the two coils by changing in a coordinated way the magnitude and frequency of the AC voltage at the terminals of the primary coil.

The particular converter topology used to implement the DC/AC converter at sending end is irrelevant, as long as it gives the possibility to control magnitude and frequency of the excitation voltage independently. In the most usual implementation, the DC/AC converter described above may be based on a H-connection of four switching devices that are controlled to generate any value of AC voltage, starting from a given DC-side voltage.

An optional additional DC-DC converter can be placed between the input DC voltage and the DC-side of the H-bridge, in order to enable high frequency operation at reduced losses. The cascade connection of DC-DC+H-bridge is still a DC/AC converter that can control voltage and frequency independently.

The load at the secondary side can have constant-voltage characteristics, and the load with constant-voltage characteristics can be a chargeable battery.

The rectifier apparatus may be configured for independent control of the AC voltage at the terminals of the resonant pickup coil at the secondary side. In one aspect of the present invention the apparatus for wireless transmission of power from a DC voltage source to a DC voltage load, further comprises at least one additional control circuit that calculates the voltage magnitude to be enforced at the terminals of the resonant pickup coil at the secondary side. AC voltage at pickup coil terminals can be controlled independently of frequency and pickup current. This is equivalent to controlling the impedance at pickup coil terminals.

According to the present invention it is also disclosed a method for wireless transmission of power from a DC voltage source to a DC voltage load, comprising the steps of:
  a. loosely coupling one primary coil with one secondary coil,
  b. equipping each with a series-connected resonant capacitor, so that the coil on the primary side resonates at the same frequency as the one on the secondary side;
  c. arranging said resonant coils on the primary side and the secondary side so that mutual movement is possible;
  d. providing a DC/AC-converter converting the DC voltage at primary side to an AC voltage of controllable magnitude and frequency;
  e. providing a rectifier that converts the AC voltage at the terminals of the resonant pickup coil at the secondary side to a DC voltage;
  f. providing a control system that regulates the power flow between the primary and secondary coils by changing in a coordinated way the magnitude and frequency of the AC voltage at the terminals of the primary resonant coil;
  g. providing a load at pickup-side that has constant-voltage characteristics.

Step g may further include providing said load with constant-voltage characteristics as a chargeable battery.

According to another aspect of the invention, the method can further comprise the steps of:
  configuring said rectifier apparatus for independent control of the AC voltage at the terminals of the resonant pickup coil, and
  providing an additional control circuit that calculates the voltage magnitude to be enforced at the terminals of the resonant pickup coil at the secondary side.

According to another aspect of the invention, the control system may regulate the excitation frequency to always be equal or higher than the resonant frequency, and in yet an aspect the control system may regulate the excitation frequency to always be equal or lower than the resonant frequency.

In another aspect, the method can further comprise the steps of: providing the DC/AC-converter based on a H-connection of four switching devices that are controlled so as to generate any desired value of AC voltage, starting from a given DC-side voltage.

The method may also comprise the steps of:
  providing the DC/AC-converter based on the H-connection of four switching devices that are controlled so to generate a square-wave voltage of amplitude fixed by the DC-side voltage, and
  a DC-DC converter between the input DC-voltage source and the DC-voltage at the inverter input.

Other advantageous features appear from the appended independent claims, whereas particular embodiments of the present invention appear from the appended dependent claims.

BRIEF DESCRIPTION OF DRAWINGS

In order to make the invention more readily understandable, the discussion that follows will refer to the accompanying drawings, in which.

BEST MODE FOR CARRYING OUT THE INVENTION

Figure 1:
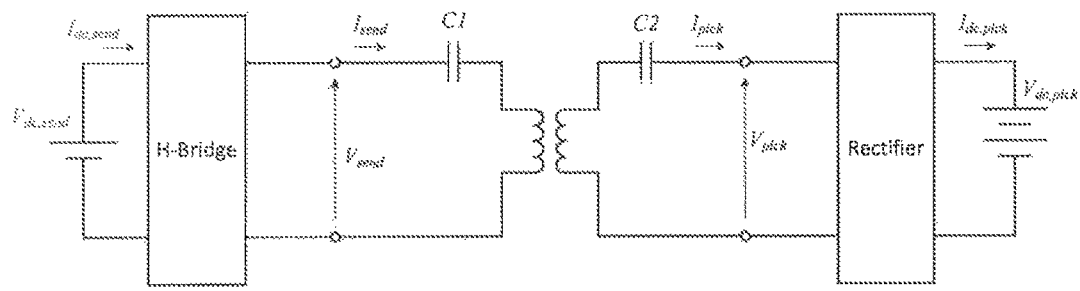
FIG. 1 is a schematic representing a wireless power transfer apparatus with series-connected resonant capacitors, and its main components.

The present invention relates to wireless power transfer, and in particular to wireless power transfer where the coupling coefficient varies, that is where primary and secondary coils are loosely coupled. Such arrangements may find wide fields of application.

In the following discussion, it will be adhered to the accompanying drawings; however the drawings do not necessarily disclose all features/components, moreover the components shown in the drawings are not mandatory. The drawings are meant to ease understanding of the present invention.

It shall be appreciated that by loosely coupled there is no restriction on the relative movement: i.e. full 6-degrees of freedom (x-y-z, roll, pitch, yaw) are allowed, as the parameters affecting power flow equations are the resulting magnetic coefficients (self-inductances and coupling coefficient). For the same reason, it is not important whether it is the primary or secondary coil (or both) that is moving. The only constraint on the speed of movement is that it must be much slower that the time-frame corresponding to the electrical resonant frequency of the system. This is however satisfied in most practical cases.

Cross-link feedback can be used to improve power transfer efficiency as well as to reduce the power ratings of converters when the relative position of sending and receiving coils is allowed to vary widely during operation. The two compensated coils are tuned to have the same resonant frequency. Operation at resonance is used when the coupling between the coils is sufficiently low, while off-resonance operation is allowed when the coupling increases, resulting in increased power transfer for the same input/output voltages. Smaller coils and much smaller power converters can be used, since the worst-case current is reduced compared to conventional resonant operation.

Further reduction of losses is achieved by tuning the apparatus so that the primary self-resonant frequency is slightly lower than the secondary self-resonant frequency, thus achieving slightly inductive power factor operation and reduced switching losses of the primary side converter over the whole operating range.

As stated above, the present invention relates to an apparatus and a method for transmitting power between two loosely coupled coils mounted on structures that may have significant relative movement. By allowing for off-resonance operation of a properly designed IPT, minimization of the converter semiconductor requirement can be achieved.

In order to illustrate the principle, let us refer to the general IPT apparatus in FIG. 1. In such apparatus, power is intended to flow from the rectified mains to the pickup-side DC source. The latter can be either the physical terminals of a battery, or the constant-voltage terminals of a DC subsystem.

Figure 2:
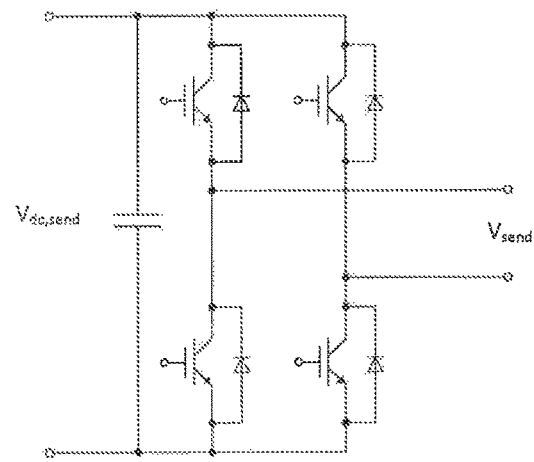
FIG. 2 is the schematic of an H-bridge circuit used as inverter, including four IGBT switching devices and a smoothing capacitor on the DC-side.

The high-power part of the H-Bridge is shown in FIG. 2. IGBT devices are shown, as it will be the case when substantial power (more than 100 kW) has to be transmitted. Such bridge can be operated in square-wave mode, resulting in variable (controllable) frequency with fixed AC-voltage magnitude determined uniquely by the DC-voltage level at the bridge input. Alternatively, zero-voltage states of controlled duration can be added to the output voltage waveform, so that both AC voltage magnitude and frequency can be independently regulated. The achievable rms value of the fundamental component of AC voltage output is:

$$0 \leq V_{send} \leq \frac{4}{\pi\sqrt{2}} \cdot V_{dc,in} \qquad (0.3)$$

Figure 6:
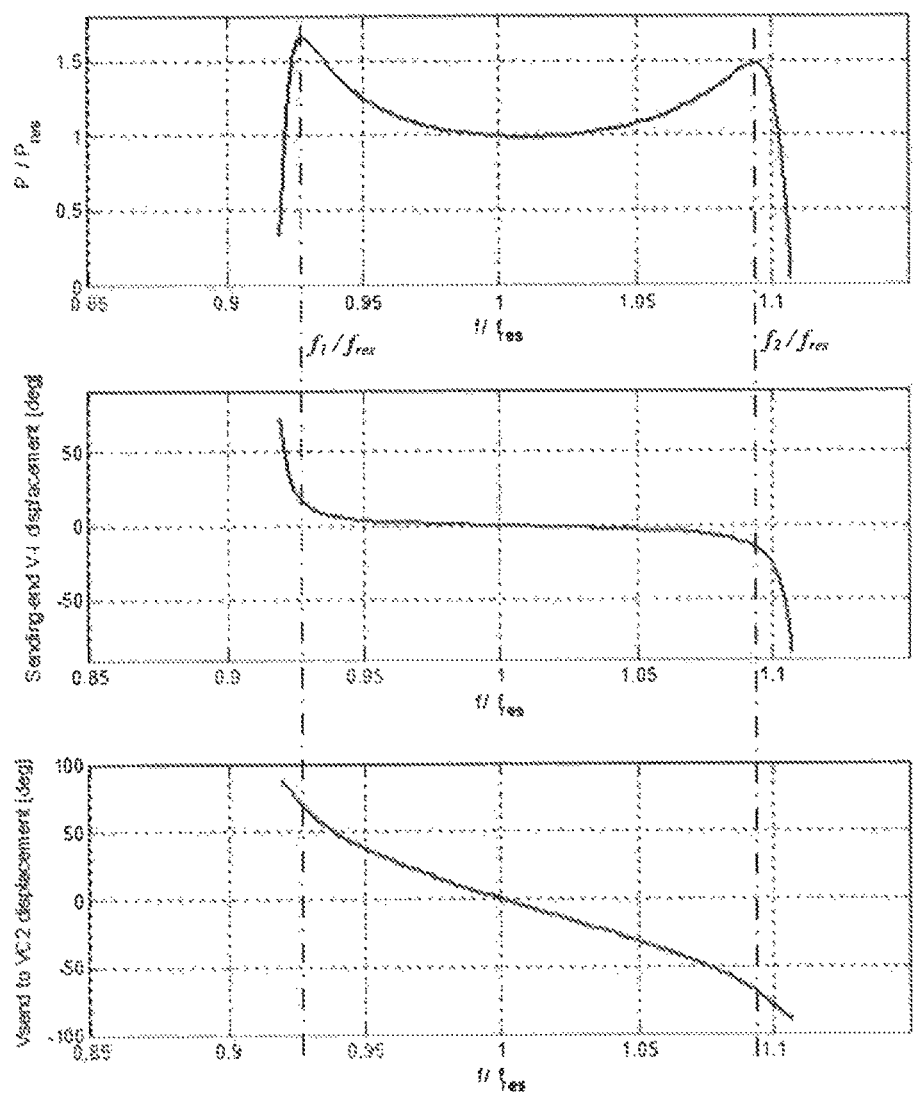
FIG. 6 is a plot of the frequency characteristics of a pair of loosely coupled coils with series compensation on both sending and pickup sides; transmitted power, phase displacement between sending-end voltage and current, phase displacement between sending-end voltage and pickup-end capacitor voltage are shown as function of operating frequency, for fixed magnitude of sending and pickup voltages.
Figure 7:
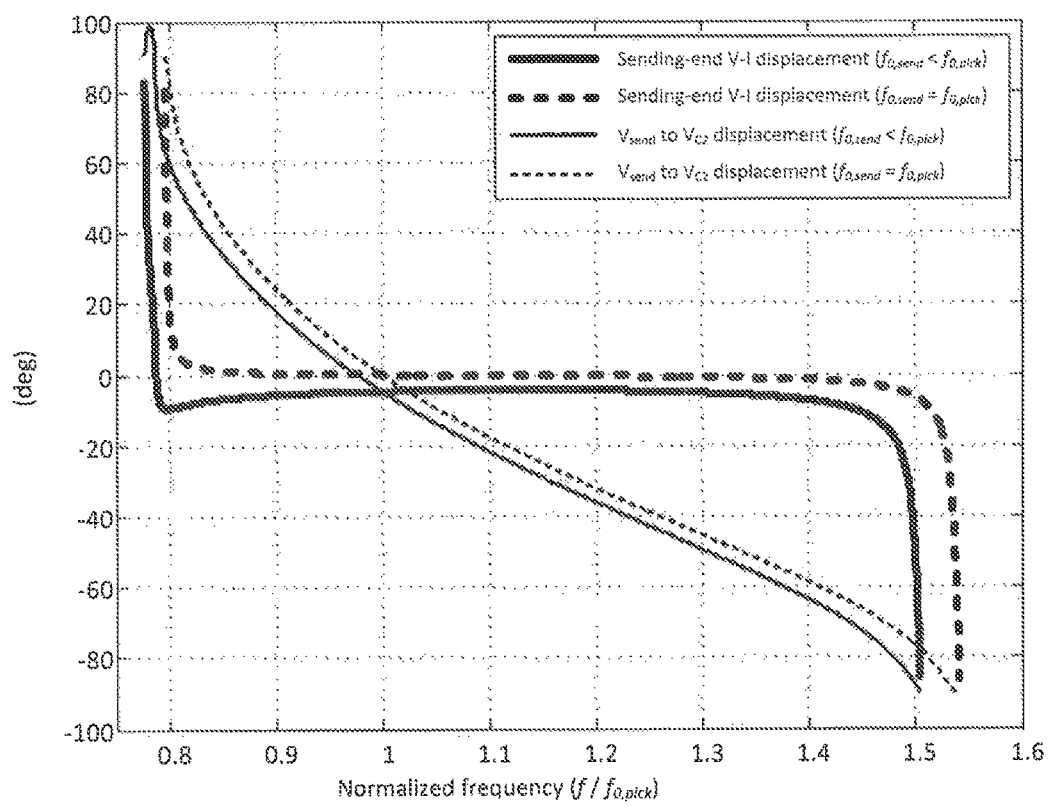
FIG. 7 is a plot of showing the effect of detuning between primary and secondary self-resonant frequencies on phase displacement between sending-end voltage and current and on phase displacement between sending-end voltage and pickup-end capacitor voltage.

No theoretical restriction on the excitation frequency is introduced by the DC/AC-converter; however, for practical reasons, it might be specified that the frequency may be varied with +/−50% around the resonance frequency. FIG. 6 and FIG. 7 suggest that for typical designs far less than 50% of frequency variation is actually necessary.

In FIG. 1, sending and pickup coils are compensated by means of the series capacitors C1 and C2, respectively. The capacitance values are normally determined so that both coils resonate at the same frequency in nominal conditions ($\omega_{0,send} = \omega_{0,pick}$):

$$\omega_{0,send}^2 = \frac{1}{L_1 C_1};$$

$$\omega_{0,pick}^2 = \frac{1}{L_2 C_2}$$

(0.4)

Figure 3:
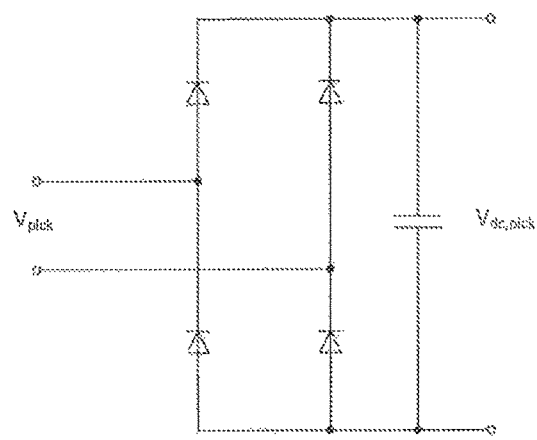
FIG. 3 is the schematic of a diode rectifier based on bridge configuration.
Figure 4:
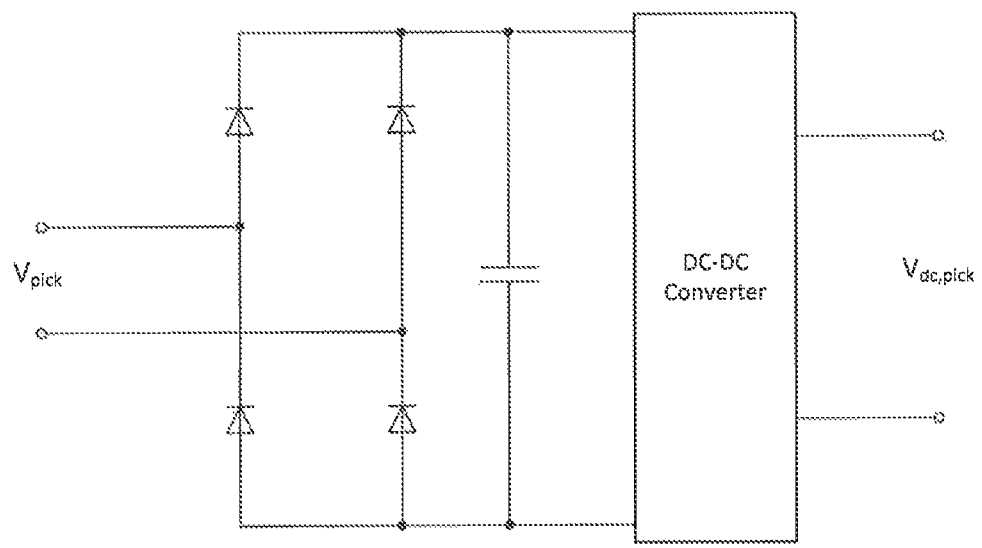
FIG. 4 is the schematic of an active rectifier, constituted by the cascade connection of a diode rectifier and a DC-DC converter.
Figure 5:
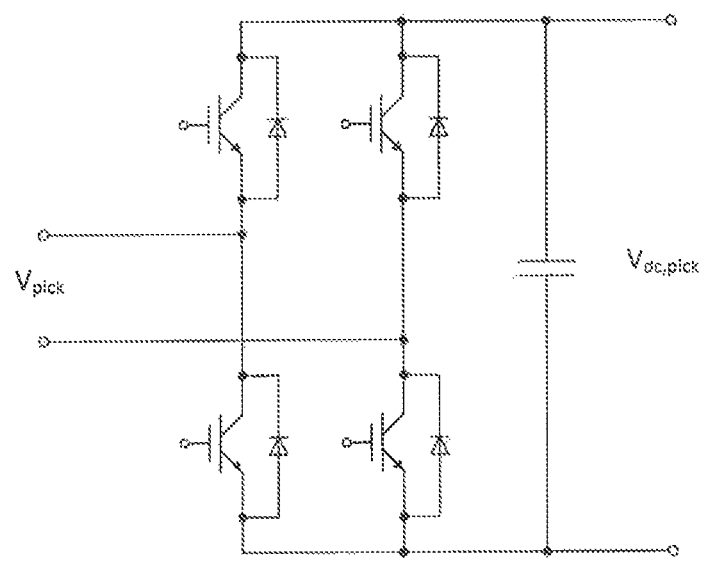
FIG. 5 is the schematic of an active rectifier based on the H-bridge topology, with four controllable switching devices (IGBTs) and associated anti-parallel diodes.

The pickup-side rectifier in FIG. 1 can either be a passive rectifier (FIG. 3) or an active rectifier (FIG. 4, FIG. 5).

In the case of passive rectifier, the pickup-side AC voltage is uniquely determined by the pickup-side DC voltage, and the equivalent pickup resistance at the rectifier terminals is also uniquely determined by the load:

$$V_{pick} = \frac{4}{\pi\sqrt{2}} \cdot V_{dc,out},$$

$$R_{eq,pick} = \frac{8}{\pi^2} \cdot \frac{V_{dc,out}}{I_{dc,out}}$$

(0.5)

If an active rectifier is used, both the pickup AC voltage and the pickup equivalent resistance can be changed, adding one more degree of freedom to the control strategy.

At resonant frequency, neglecting losses in coils and capacitors, the power flow is expressed by the simple relationship:

$$P_{res} = \frac{V_{send} \cdot V_{pick}}{\omega_0 \cdot M}$$

(0.6)

The apparatus must be designed so that rated power flow can be achieved over the whole range of expected variation of the coupling coefficient. The latter only influences the mutual inductance M in the equation above, in a way that is essentially linear. Series-series compensation ensures that the resonant frequency is essentially unaffected by the changing k. As a consequence, if the apparatus is always operated at resonance, the following must hold:

$$P_{res} = \frac{V_{send,max} \cdot V_{pick,max}}{\omega_0 \cdot M_{max}} =$$

$$\frac{V_{send,min} \cdot V_{pick,min}}{\omega_0 \cdot M_{min}} \Rightarrow \frac{V_{send,max} \cdot V_{pick,max}}{V_{send,min} \cdot V_{pick,min}} \approx \frac{k_{max}}{k_{min}}$$

(0.7)

The same kind of relationship applies to the coil currents.

It is hereby noticed that in the converters of FIG. 2, FIG. 3, FIG. 4, the maximum AC-side voltage determine the necessary voltage blocking capabilities of the switches (IGBTs or diodes), while the maximum AC-side current corresponds to the maximum current that the switches have to conduct during their ON state. Consequently, operation at widely variable coupling coefficient leads to very severe requirements for the switches, if resonant operation is always maintained.

The worst case for the sending-end bridge is when a passive pickup structure is used, resulting in:

$$V_{send,max} \cdot I_{send,max} = P_{res} \cdot \frac{k_{max}}{k_{min}}$$

(0.8)

If the pickup rectifier is also able to regulate the voltage, then the Volt-Ampere requirement for the sending-end bridge can be reduced, by equally distributing the current increase due to reduced coupling between sending and pickup converters:

$$V_{send,max} \cdot I_{send,max} = P_{res} \cdot \sqrt{\frac{k_{max}}{k_{min}}}$$

(0.9)

Investigations leading to the present disclosure have shown that allowing for non-resonant operation may substantially reduce the semiconductor requirements for the H-bridge from the values predicted above.

It can be verified that when the IPT apparatus is designed so that the same maximum value of the current density is achieved in both sending and pickup coils, the power transfer as function of excitation frequency for given sending and pickup voltage magnitudes is of the form shown in FIG. 6. The characteristic features a local minimum at a frequency close to the resonant one, with pronounced peaks at two frequencies that are respectively below (f1) and above (f2) the resonant one. This fact, combined with the observation that the phase displacement between excitation voltage and current is rather insensitive to the operating frequency in the whole range $f_1 \leq f \leq f_2$, can be used to boost the power flow when the apparatus is operated at maximum coupling, thus requiring a maximum operating voltage that is lower than the one predicted by equation 0.6.

From FIG. 6, it is shown that operation in the frequency range $f_1 \leq f \leq f_2$ results in close to unity power factor, meaning that the converter at primary side, if operated in square-wave mode, will always commutate when the current is very close to zero. This is non-optimal for actual IGBT devices that have best performance when the commutation current is slightly lagging the voltage.

Investigation leading to this disclosure has shown that a slight detuning between primary and secondary self-resonant frequencies so that $f_{0,send} < f_{0,pick}$ has the desirable effect of shifting the sending-end V-I phase displacement characteristics towards inductive operation, as shown in FIG. 7. The detuning has almost no effect on the power flow at resonance and has the additional effect of Increasing the power flow at sub-resonant operation ($f_1 \leq f \leq f_{0,pick}$).

The use of slight detuning allows therefore for slightly inductive operation of the primary converter with consequently minimum switching loss over the operating range $f_1 \leq f \leq f_{0,pick}$.

Resonant operation is performed when the coupling is at minimum, so that equation 0.6 holds. As a result, the ratio between minimum and maximum voltage for rated power flow will be reduced from the one predicted by equation (0.8) or (0.9), allowing for use of switching devices with reduced current ratings.

Power flow conditions at minimum and maximum coupling given in equation (0.7) for conventional operation in resonance are generalized as follows:

$$P_{max} = P(k_{max}, V_{send,max}, \overline{\omega}) = P(k_{min}, V_{send,min}, \omega_0)$$

(0.10)

The maximum voltage at sending end is conveniently chosen to be as high as possible for the given $V_{dc,in}$, in order to minimize the current and maximize the efficiency. Still, there exist an infinite number of combinations ($V_{send,min}, \overline{\omega}$) satisfying the relationship above. One more criterion is therefore necessary for design. The following options can be proposed:

a) Rated power flow at maximum coupling is achieved exactly at the peak of the power-frequency characteristics of FIG. 6:

$$P_{max} = \max(P(k_{max}, V_{send,max}, \omega_1), P(k_{max}, V_{send,max}, \omega_2)) \quad (0.11)$$

b) Same peak resonant voltage is obtained at minimum and maximum coupling with rated power flow:

$$V_{C1}(k_{max}, V_{send,max}, \overline{\omega}) = V_{C2}(k_{min}, V_{send,min}, \omega_0) \quad (0.12)$$

c) Input phase displacement does not exceed a given threshold value:

$$\varphi_{VI}(k_{max}, V_{send,max}, \overline{\omega}) = \varphi_{VI,max} \quad (0.13)$$

Other criteria are possible, leading to almost equivalent designs.

In order to control the power flow of the proposed IPT, it is necessary to act in a coordinated way on both excitation voltage and frequency. One additional degree of freedom in the control action is constituted by the possibility to control the magnitude of the AC voltage at pickup side, if an active rectifier structure is used.

Figure 8:
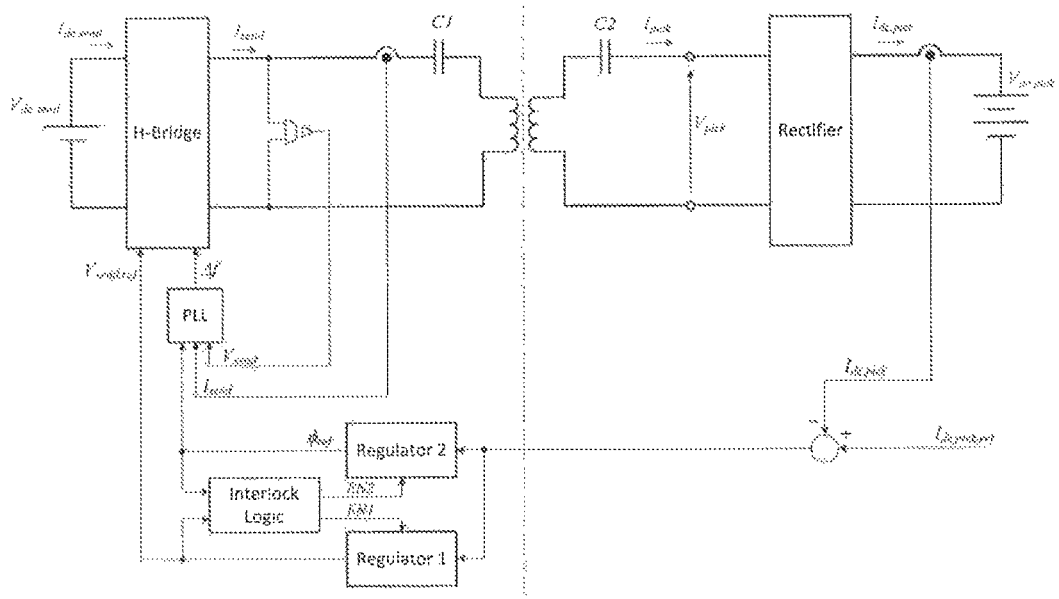
FIG. 8 shows the wireless power transfer apparatus and the block diagram of the control system used to regulate the power flow in case of sending-end voltage/frequency control. Sending-end voltage/current displacement as detected by a Phase Locked Loop (PLL) is used as control variable for determination of the operating frequency.

The control system for the case where only a passive rectifier is used at pickup-side is shown in FIG. 8. The following main functional blocks are present:

Charging current regulator acting on sending-end voltage magnitude;

Charging current regulator acting on phase-displacement reference;

Interlock logic that enables either of the regulators above;

Phase Locked Loop (PLL) and associated logic to regulate the phase of the controlled (feedback) signal to the reference value output by regulator 2.

Regulator 1 can be any linear or non-linear regulator, like for instance a conventional Proportional-integral (PI) controller; it generates a voltage magnitude command varying within the achievable range (equation (0.3)). The regulator is enabled by the interlock logic; when disabled, the outputs and all the internal states (if present) are frozen to their current value.

Regulator 2 can be any linear or non-linear regulator, like for instance a conventional PI controller; it generates a phase displacement command varying between the allowable range:

$0 \leq \varphi_{ref} \leq \varphi_{ref,max}$ if operation above resonance is desired $-\varphi_{ref,max} \leq \varphi_{ref} \leq 0$ if operation below resonance is desired  (0.14)

It is noted that $\varphi_{ref} = 0$ causes the apparatus to operate exactly at resonant frequency. In particular, if the apparatus is designed with slight detuning between primary and secondary resonant frequencies, $\varphi_{ref} = 0$ forces operation at exactly $f_{0,send}$, if cross-link feedback is used in the PLL.

Regulator 2 is enabled by the interlock logic (3); when disabled, the outputs and all the internal states (if present) are frozen to their current value.

The interlock logic checks the output of the two regulators (Regulator 1 and Regulator 2) and generates the enable signals according to the following logic:

IF Regulator 1 was enabled, THEN IF Regulator 1 has reached its maximum allowed output, Enable Regulator 2 AND Disable Regulator 1.

ELSE (Regulator 2 was enabled), IF Regulator 2 has reached zero output, Enable Regulator 1 AND Disable Regulator 2.

Some small hysteresis and/or hold-off time can be added in the decision process above, to avoid chattering between the two states.

The PLL logic takes the phase difference between the excitation voltage at sending-end (Vsend) and the feedback signal, trying to make it equal to the phase reference generated by Regulator 2. Its output is a correction term for the frequency of the sending-end fundamental voltage.

The feedback signal can be one of the following:

Sending-end AC current (H-bridge current), as indicated in FIG. 8. This arrangement has the advantage of not needing a high-bandwidth feedback from the pickup-side of the IPT; however, the controller can become unstable under certain operating conditions, due to the well-known phenomenon of bifurcation that may cause the phase-displacement between sending-end voltage and current to change the sign of its gradient around the resonant frequency. In general, even if bifurcation is avoided, sending-end V-I phase displacement is quite insensitive to frequency variation, as shown in the characteristic of FIG. 6.

Figure 9:
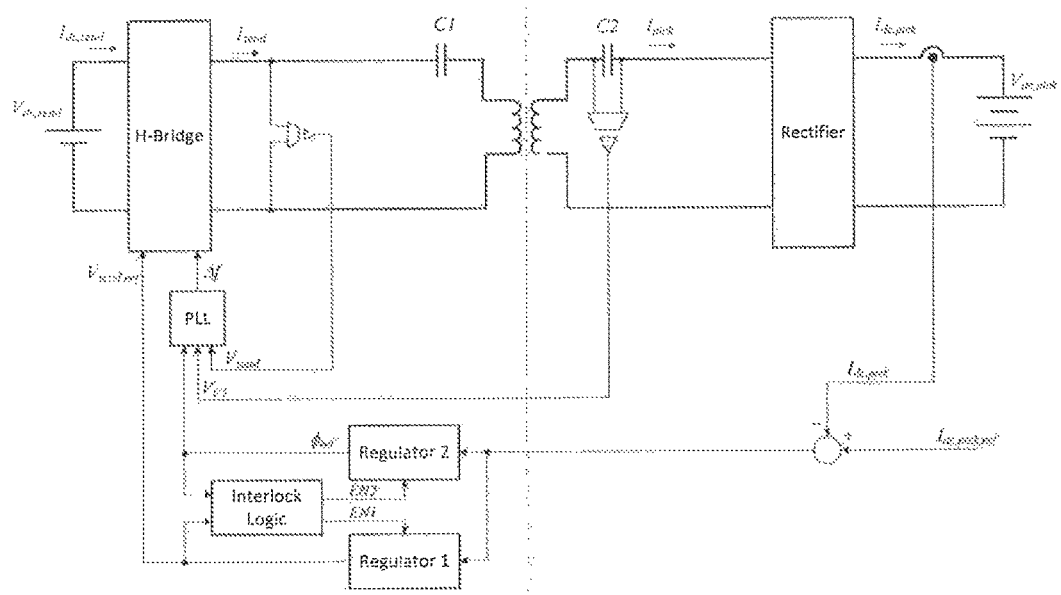
FIG. 9 shows the wireless power transfer apparatus and the block diagram of the control system used to regulate the power flow in case of sending-end voltage/frequency control. Phase displacement between sending-end voltage and pickup capacitor voltage is used as control variable for determination of the operating frequency.

Pickup end voltage across resonant capacitor (C2), as indicated in FIG. 9. This solution is much more robust in terms of control stability, as bifurcation phenomenon never occurs and sensitivity of the phase displacement between Vsend and VC2 to operating frequency is always so that stable control can be achieved. It is noted that at resonance, Vsend and Vc2 are in phase (zero displacement).

Pickup end AC current.

Pickup end AC voltage.

Last two options are basically equivalent to the previous one, as Vc2, Vpick and Ipick are directly related by the fixed relationship:

$$V_{C2} = \frac{1}{j\omega C_2} \cdot I_{pick} \Rightarrow \angle V_{C2} = \angle I_{pick} - 90° \quad (0.15)$$

$$\angle V_{pick} = \angle I_{pick} \quad (0.16)$$

These solutions are therefore equivalent to the one using VC2 in terms of achievable control performance.

Drawback of solutions based on pickup signals is the need for high-bandwidth feedback from pickup-side of the IPT. The alternative solution shown in FIG. 10 is therefore proposed.

Figure 10:
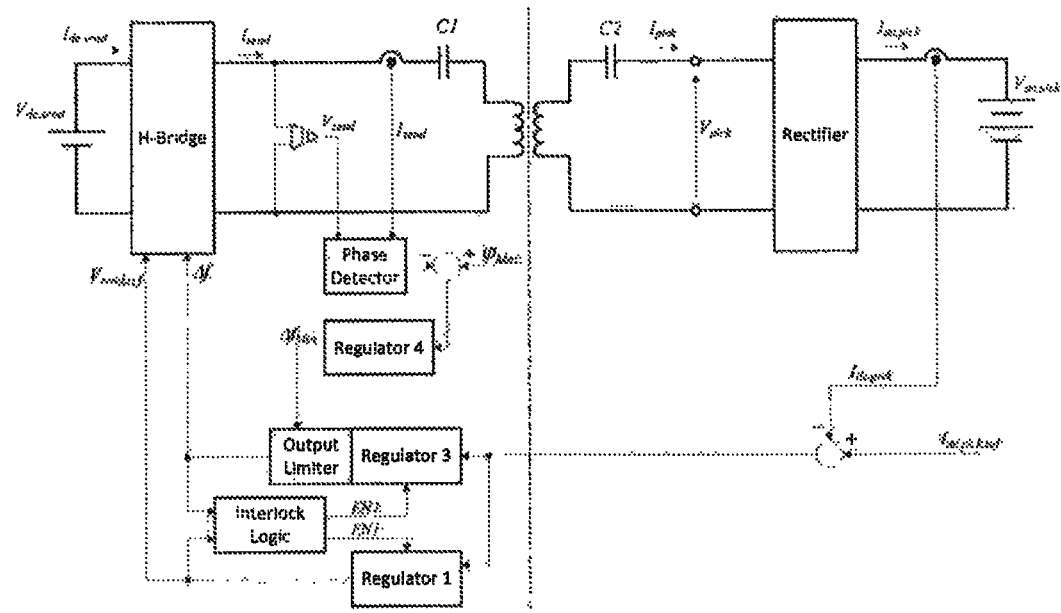
FIG. 10 shows the wireless power transfer apparatus and the block diagram of the control system used to regulate the power flow in case of sending-end voltage/frequency control. Phase displacement between Sending-end voltage/current is used directly as control variable for determination of the operating frequency without using PLL.

In the system of FIG. 10, the original charging current regulator acting on phase displacement reference (Regulator 2 in FIG. 8 and FIG. 9) has been replaced with charging current regulator (Regulator 3) acting on H-bridge output frequency.

Moreover, the following control blocks have been added:

Phase Detector, evaluating the angular displacement between voltage and current: $\varphi = \angle V_{send} - \angle I_{send}$.

Frequency limit regulator (Regulator 4), generating the output limit for Regulator 3.

Output limiter for Regulator 3, dynamically limiting the output of the regulator, when it exceeds the value calculated by Regulator 4.

Figure 11:
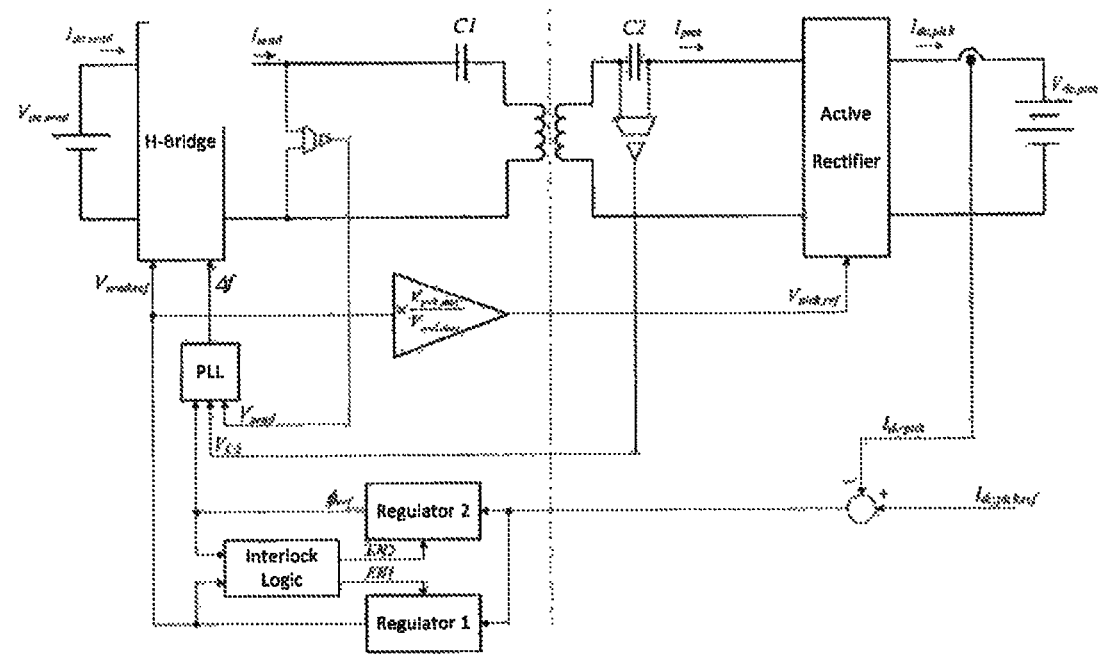
FIG. 11 shows the wireless power transfer apparatus and the block diagram of the control system used to regulate the power flow in case of sending-end voltage/frequency control combined with pickup-end voltage control.
Figure 12:
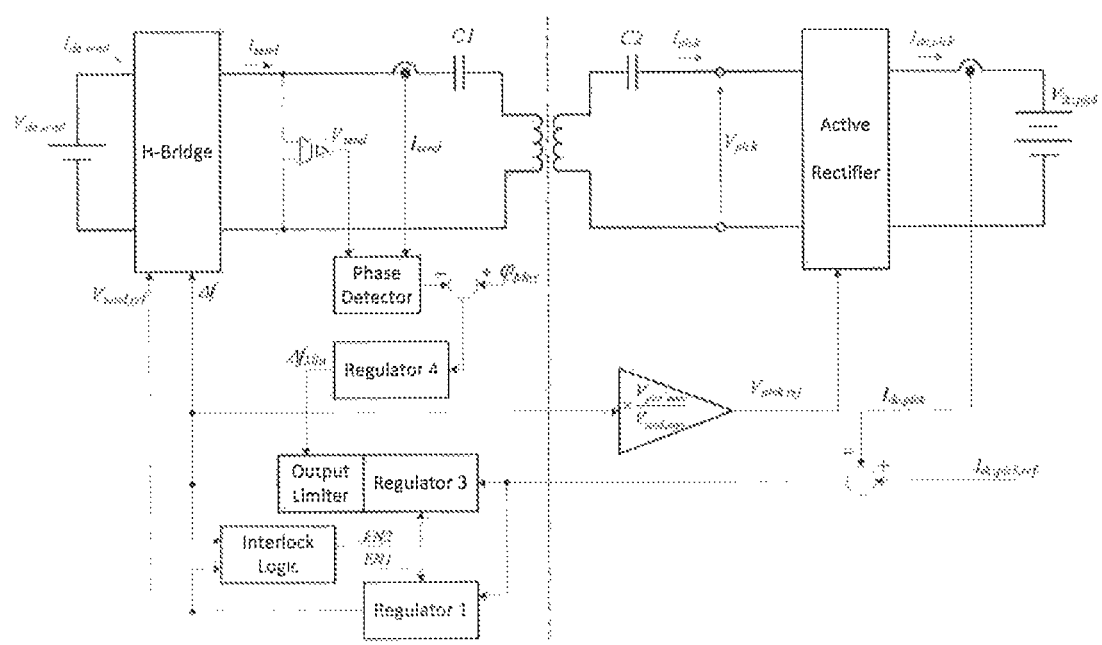
FIG. 12 shows the wireless power transfer apparatus and the block diagram of the control system used to regulate the power flow in case of sending-end voltage/frequency control combined with pickup-end voltage control for the case when no PLL is used.

In case an active rectifier of the type shown in FIG. 4 or FIG. 5 is used at pickup-side, the control systems of FIG. 9 and FIG. 10 are slightly modified according to FIG. 11 and FIG. 12, respectively.

The only difference between the systems in FIG. 9 and FIG. 11 is that the output of Regulator 1 is used to command not only the amplitude of the sending-end voltage, but also to command the voltage ratio of the pickup-side DC-DC converter. This structure ensures that the per-unit ratio between the amplitudes of Vsend and Vpick remains constant and equal to the nominal value, thus minimizing the overall Volt-Ampere requirements.

Similarly to what explained before, the feedback signal used by the PLL can come from different sources:
- Sending-end AC current (Isend);
- Pickup-end voltage across resonant capacitor (VC2);
- Pickup-end voltage at the rectifier AC terminals (Vpick);
- Pickup-end AC current (Ipick).

The only difference between the systems in FIG. 10 and FIG. 12 is that the output of Regulator 1 is used to command not only the amplitude of the sending-end voltage, but also to command the voltage ratio of the pickup-side DC-DC converter. This structure ensures that the per-unit ratio between the amplitudes of Vsend and Vpick remains constant and equal to the nominal value, thus minimizing the overall Volt-Ampere requirements.

One Embodiment of the Present Invention

The present invention may find its application within a wide area of fields such as but not limited to:
- Inductive charging of parked Electric Vehicles (EVs). In this case, the airgap does not change while charging, but there may be an unknown misalignment that must be taken into account during the design phase.
- Inductive charging of ships or other marine vessels with battery-electric propulsion systems
- Continuous power supply to movable equipment (robotic arms, etc.), where wires may constitute a hindrance to movement and/or reduce reliability.
- Power supply to a movable equipment placed in an un-accessible (or sealed) environment.
- Power supply of trains, trams and buses, in particular in city areas, where exposed high voltage or medium voltage wires are undesirable In one example of an Inductive power transfer apparatus according to the invention the apparatus is rated for 1 MW of continuous power transfer at a distance variable between 15 and 50 cm. The apparatus configuration is shown in FIG. 1 and comprises:

Primary coil, with external dimensions of approximately 1.0 m width and 2.0 m length; the coil is planar, and is wound on top of a backplate of magnetic material. The coil is connected in series with capacitor banks, so that the resulting resonant frequency is in the order of 3-5 kHz. Secondary coil, with external dimensions of approximately 1.0 m width and 2.0 m length; the coil is planar, and is wound on top of a backplate of magnetic material. The coil is connected in series with capacitor banks, so that the resulting resonant frequency is in the order of 3-5 kHz. Sending-end DC/AC converter of the type shown in FIG. 2, operating with a DC voltage of maximum 1000 V.

Rectifier at pickup of the type in FIG. 3, with a load-side DC voltage of 1000 V.

With the given dimensions and geometry, it is calculated that the coupling coefficient varies between about 0.6 and 0.2, when the two coils are perfectly opposed to each other and the distance between them is varied between the specified limits. According to (0.8), a worst-case current of at least 3333 A must be allowed to flow into the sending coil and into the solid-state devices of the converter at sending-end, if the conventional method of resonant operation is used to operate the apparatus.

The control system in FIG. 9, allows for a reduction in worst-case current to about 1270 A, with consequent downsizing of coil and converter. The number 1270 A is calculated by considering the power/frequency characteristic (as in FIG. 6) of the given design and then evaluating the voltages and currents that are needed to transfer the rated power at the frequency where such characteristic has the peak. Mathematically, this is equivalent to solving equation (0.10) using the constraint defined by (0.11).

A Second Embodiment of the Present Invention

In a second embodiment of the invention, it is provided an inductive power transfer apparatus rated for 1 MW of continuous power transfer at a distance variable between 15 and 50 cm. The apparatus configuration is shown in FIG. 1 and comprises:

Primary coil, with external dimensions of approximately 1.0 m width and 2.0 m length; the coil is planar, and is wound on top of a backplate of magnetic material. The coil is connected in series with capacitor banks, so that the resulting resonant frequency is in the order of 3-5 kHz. Secondary coil, with external dimensions of approximately 1.0 m width and 2.0 m length; the coil is planar, and is wound on top of a backplate of magnetic material. The coil is connected in series with capacitor banks, so that the resulting resonant frequency is in the order of 3-5 kHz. Sending-end DC/AC converter of the type shown in FIG. 2, operating with a DC voltage of maximum 1000 V.

Rectifier at pickup of the type in FIG. 4, with a load-side DC voltage of 1000 V.

With the given dimensions and geometry, it is calculated that the coupling coefficient varies between about 0.6 and 0.2, when the two coils are perfectly opposed to each other and the distance between them is varied between the specified limits. According to (0.9), a worst-case current of at least 1925 A must be allowed to flow into the sending coil and into the solid-state devices of the converter at sending-end, if the conventional method of resonant operation is used to operate the apparatus.

The control system in FIG. 10, allows for a reduction in worst-case current to about 1430 A, with consequent downsizing of coil and converter.

| Definition list | |
| --- | --- |
| Inverter | DC/AC-converter converting DC voltage to an AC voltage |

The invention claimed is:

1. An apparatus for wireless transmission of power from a DC voltage source to a DC voltage load, comprising:
   a) a primary coil and a secondary coil, the primary coil and the secondary coil each connected with capacitive devices configured to achieve a common resonance frequency, $\omega_0$;
   b) said primary coil and secondary coil are mutually movable during operation;
   c) a DC/AC-converter converting the DC voltage at a primary side to an AC voltage of controllable magnitude and frequency at the primary side;
   d) a rectifier at a secondary side converting the AC voltage at terminals of the secondary coil to a DC voltage at the load on the secondary side; and
   e) a control system that regulates the power flow between the primary and the secondary coil and automatically adapts to changes in the mechanical positions of the two coils by changing in a coordinated way the magnitude and frequency of the AC voltage at the terminals of the primary coil during operation, wherein said rectifier is configured for control of the AC voltage amplitude and frequency at the terminals of the secondary coil at the secondary side, and the apparatus further comprises at least one additional control circuit that calculates the magnitude of the voltage to be enforced at the terminals of the secondary coil at the secondary side.

2. The apparatus of claim 1, wherein the primary coil and the secondary coil that are connected with capacitive devices configured to achieve a common resonance frequency, ω0; while when the coupling increases off-resonance operation is allowed.

3. The apparatus of claim 1, wherein the load at the secondary side has constant-voltage characteristics.

4. The apparatus of claim 3, wherein said load with constant-voltage characteristics is a chargeable battery.

5. The apparatus of claim 1, where said DC voltage source is obtained by rectification of the AC mains.

6. The apparatus of claim 1, wherein the DC/AC-converter is based on a H-connection of four switching devices that are controlled to generate any value of AC voltage, starting from a given DC-side voltage.

7. The apparatus of claim 1, wherein the DC/AC-converter is based on the H-connection of four switching devices that are controlled so as to generate a square-wave voltage of amplitude fixed by the DC-side voltage, and a DC-DC converter between the input DC-voltage source and the DC-voltage at the DC/AC converter input.

8. A method for wireless transmission of power from a DC voltage source to a DC voltage load, comprising the steps of:
a. loosely coupling a primary coil with a secondary coil,
b. equipping the primary coil and the secondary coil with a series-connected resonant capacitor, so that the primary coil on the primary side resonates at the same frequency, $\omega_0$ as the secondary coil on the secondary side;
c. arranging said primary coil on the primary side and secondary coil on the secondary side so that mutual movement during operation is possible;
d. providing a DC/AC-converter converting a DC voltage at the primary side to an AC voltage of controllable magnitude and frequency;
e. providing a rectifier that converts the AC voltage at the terminals of the secondary coil at the secondary side to a DC voltage;
f. providing a control system that regulates the power flow between the primary coil and the secondary coil and automatically adapts to changes in the mechanical positions of the primary coil and the secondary coil by changing in a coordinated way the magnitude and frequency of the AC voltage at the terminals of the primary coil;
g. providing a load at the secondary side that has constant-voltage characteristics,
h. configuring said rectifier for independent control of the AC voltage at the terminals of the resonant pickup coil, and
i. providing an additional control circuit that calculates the magnitude of the voltage to be enforced at the terminals of the secondary coil at the secondary side.

9. The method of claim 8, wherein step g further comprises providing said load with constant-voltage characteristics as a chargeable battery.

10. The method of claim 8, wherein the control system in step f regulates an excitation frequency to always be equal or higher than the resonant frequency, $\omega_0$.

11. The method of claim 8, wherein the control system regulates an excitation frequency to always be equal or lower than the resonant frequency, $\omega_0$.

12. The method of claim 8, further comprising the step of:
providing the DC/AC-converter based on a H-connection of four switching devices that are controlled to generate any desired value of AC voltage, starting from a given DC-side voltage.

13. The method of claim 8, further comprising the step of:
providing the DC/AC-converter based on the H-connection of four switching devices that are controlled to generate a square-wave voltage of amplitude fixed by a DC-side voltage, and a DC-DC converter between the DC-voltage source and the DC-voltage at the DC/AC-converter's input.

* * * * *